United States Patent
Datz et al.

(10) Patent No.: US 8,662,702 B2
(45) Date of Patent: Mar. 4, 2014

(54) LED BEACON

(75) Inventors: R. Michael Datz, Rochester, NY (US); Stephen T. Vukosic, West Henrietta, NY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 648 days.

(21) Appl. No.: 12/806,284

(22) Filed: Aug. 9, 2010

(65) Prior Publication Data

US 2011/0058370 A1    Mar. 10, 2011

Related U.S. Application Data

(60) Provisional application No. 61/276,115, filed on Sep. 8, 2009.

(51) Int. Cl.
*F21V 5/00* (2006.01)

(52) U.S. Cl.
USPC ............ 362/235; 362/244; 362/240; 362/237

(58) Field of Classification Search
USPC ................. 362/235, 800, 238, 230–232, 341, 362/311.02, 244, 240, 237; 313/512, 113
See application file for complete search history.

(56) References Cited

U.S. PATENT DOCUMENTS

| | | | |
|---|---|---|---|
| 3,221,162 A | 11/1965 | Heenan et al. | |
| 5,237,490 A | 8/1993 | Ferng | |
| 5,860,726 A | 1/1999 | Richardson | |
| 6,425,678 B1 | 7/2002 | Verdes et al. | |
| 6,483,439 B1 | 11/2002 | Vukosic | |
| 6,626,557 B1 | 9/2003 | Taylor | |
| 7,252,405 B2 | 8/2007 | Trenchard et al. | |
| 7,534,009 B2 | 5/2009 | Trojanowski et al. | |
| 2006/0181879 A1* | 8/2006 | Pederson | 362/341 |
| 2008/0048553 A1* | 2/2008 | Destain et al. | 313/499 |

* cited by examiner

*Primary Examiner* — Joseph L Williams
(74) *Attorney, Agent, or Firm* — Kenneth J. Lukacher Law Group

(57) ABSTRACT

An LED beacon has a plurality of LED's mounted on opposite sides of a square post in the same horizontal plane. Each LED projects the light there from through an optical system. The optical system is provided by a collimating lens, preferably a cylindrical fresnel lens and a condensing, coupling lens for each LED also mounted on the post. The optical system provides enhanced illumination distributed in a cylindrical beam emanating from the fresnel collimating lens. The illumination is enhanced in that the condensing lens shifts the focus of the collimating lens to the location of the LEDs. Nominally, the fresnel collimating lens is focused at the center of the array of LEDs (the middle of the post). The condensing lens shifts the focus radially outward to the light emitting area of the LED, and the condensing lens captures the light from the LEDs and distributes the light uniformly on the fresnel collimating lens, thus efficiently utilizing the LED light and providing an intense beacon suitable for use as a warning light on vehicles and stationary applications. The coupling lens constitutes adapter optics which may be used in other warning light applications to condense and redirect focus of LEDs, such as for example, where the cylindrical fresnel lens is replaced by a rotating or stationary reflector to form an LED beam beacon.

19 Claims, 6 Drawing Sheets

FIG. 5A SECTION A-A

LED BEACON

Priority is claimed to U.S. Provisional Application Ser. No. 61/276,115, filed Sep. 8, 2009.

The present invention relates to LED beacons and particularly, to an LED beacon having an improved optical system which may be associated with a plurality of LEDs and having a collimating lens and a plurality of condensing, coupling lenses which shift the focus of the collimating lens to the position of the LEDs and distribute the light from the LEDs uniformly on the collimating lens.

Light beacons have been provided with fresnel collimating lenses which provide cylindrical beams from a light source located centrally in the collimating lens. A typical light beacon utilizing cylindrical fresnel collimating lens is shown in U.S. Pat. No. 3,221,162, issued Nov. 30, 1965 to Heenan et al. The distribution of light from a beacon, and the shaping of light from LED sources so as to provide output beams, have also been accomplished utilizing lenses associated with each LED in an LED array. See for example, U.S. Pat. No. 6,425,678, issued Jul. 30, 2002, to Verdes et al. and U.S. Pat. No. 5,237,490, issued Aug. 17, 1993, to Ferng.

Combining lenses which shape the illumination pattern from the LEDs with a fresnel collimating lens having a cylindrical structure surrounding the LEDs and their associated lenses has not as yet been successfully accomplished, particularly when the LEDs are in an array mounted on or around a post to enable heat to be dissipated from the LEDs. One approach has been suggested in U.S. Pat. No. 7,252,405, issued Aug. 7, 2007, to Trenchard et al. There, an array of LEDs mounted on a post is surrounded by a tubular light diffusing member. This light diffusing member distributes the LED light on the fresnel collimating lens. Since the diffusing member does not control distribution of the light, it is not efficient in coupling the light from the LEDs to the collimating lens and reduces the intensity of the beacon. Also, utilizing a diffusing element is not efficient. It has been proposed to use lenses along the optical axis of a pair of LEDs. These lenses merely direct the light emitted from the LEDs radially outwardly to a fresnel collimating lens. They do not move the focus of the collimating lens to the position of the LEDs. The design is limited to opposed LEDs located along a central axis of the beacon, thereby limiting the light output of the beacon to the light which can be provided by only two LEDs. The design of such a two LED system is shown in U.S. Pat. No. 7,534,009, issued May 19, 2009, to Trojanowski et al.

Accordingly, it is an object of the present invention to provide an improved LED beacon.

It is a further object of the invention to provide an LED beacon having a plurality of LEDs circumferentially distributed about an axis by efficiently coupling the light from the LEDs to a collimating lens surrounding the LEDs notwithstanding the non-uniform illumination emitted from the LEDs and the nominal focus of the collimating lens being along an axis shifted radially inwardly from the location of the LEDs.

It is a still further object of the invention to provide an LED beacon having an improved optical system including a collimating lens and a condensing, coupling lens between the LED and the collimating lens which provides for relocation of the focus of the collimating lens and enabling collimating lenses of various diameter and height to be used with the same array of LEDs.

Another object of the invention is to provide an LED beacon having a plurality of LEDs distributed about an axis to efficiently couple the light from the LEDs to collimating optics, such as a fresnel lens formed in a dome, or beam forming optics, such as a rotational or stationary parabolic reflector, using a condensing, coupling lens as adaptor for relocating the focus of, and redistributing the light from the LEDs to, such collimating or beam forming optics, and thereby providing an intense illuminating beacon suitable for use as a warning light.

Briefly described, the present invention enables the use of cylindrical fresnel lenses of the type conventionally used in beacons for collimating the light from a central light source and enables collimating fresnel lenses of different diameters to be used with the same array of LEDs which may be mounted circumferentially spaced from each other around a central axis, as in a plane perpendicular to the axis (a horizontal plane in the typical installation). The conventional fresnel collimating lens is focused along a central optical axis which is spaced radially inward from the location of the LEDs. A condensing lens arrangement, preferably a meniscus (inside concave and outside convex) lens is used to shift the focus of the collimating lens radially outward from the center to the location of the LEDs. The condensing lens also shapes the light emitted from the LEDs so that it is uniformly distributed over the inside surface of the cylindrical fresnel collimating lens, thereby utilizing efficiently substantially all of the LED illumination, even though the illumination is not uniform from the LED itself. Both the light output and the optical efficiency of the LED beacon are enhanced in accordance with the invention.

The present invention in another embodiment provides a rotational or stationary LED beam beacon in which beam forming optics of a reflector are provided instead of the collimating fresnel lens described above. The reflector may be a parabolic reflector which can be either stationary, or rotated by a (motor driven) rotator about the internal optical assembly of the LEDs and condensing lens.

The foregoing and other objects, features, and advantages of the invention will become more apparent from a reading of the following description in connection with the accompanying drawings wherein.

Figure 4:
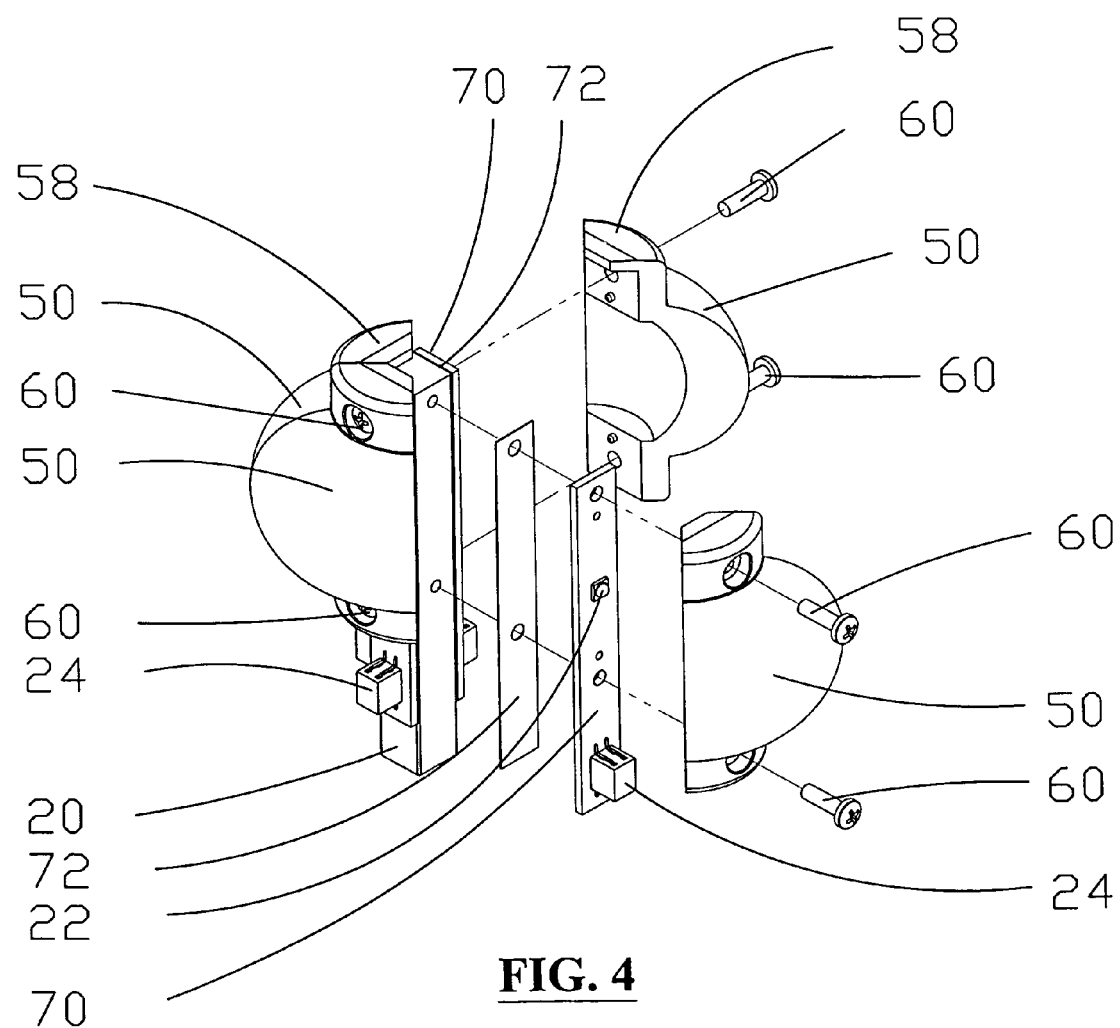
FIG. 4 is an exploded view of the condensing lens system of the beacon shown in FIGS. 1, 2 and 3.
Figure 5F:
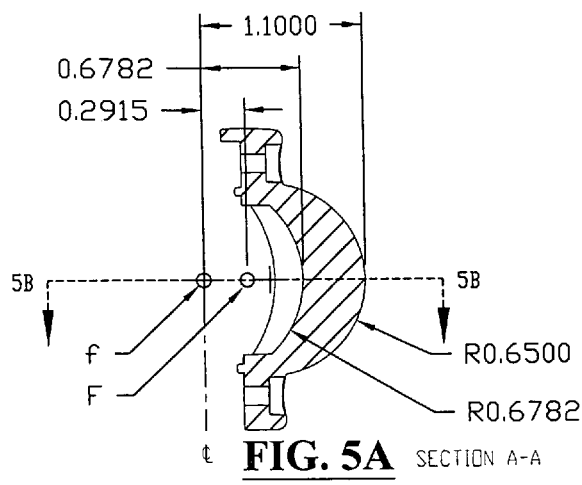
Figure 5F:
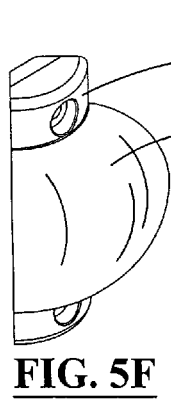
Figure 5B:
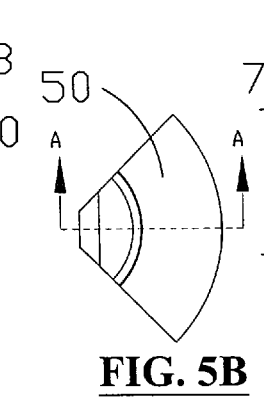
Figure 5E:
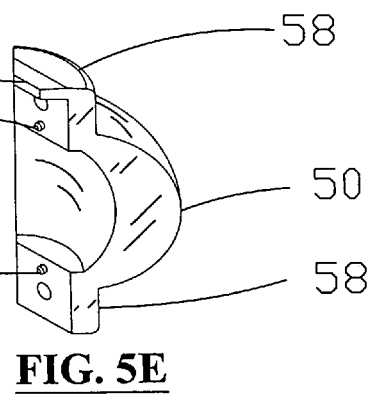
Figure 5C:
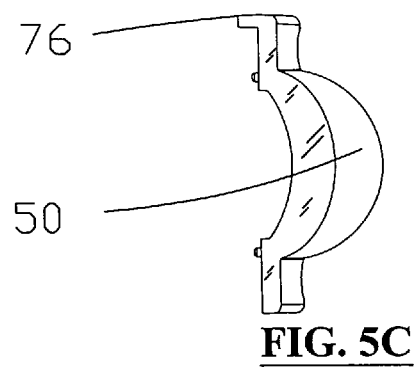
Figure 5D:
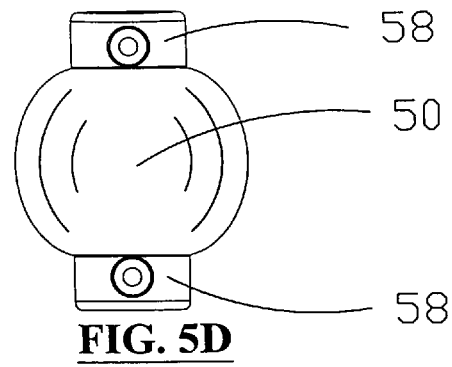
Figure 6:
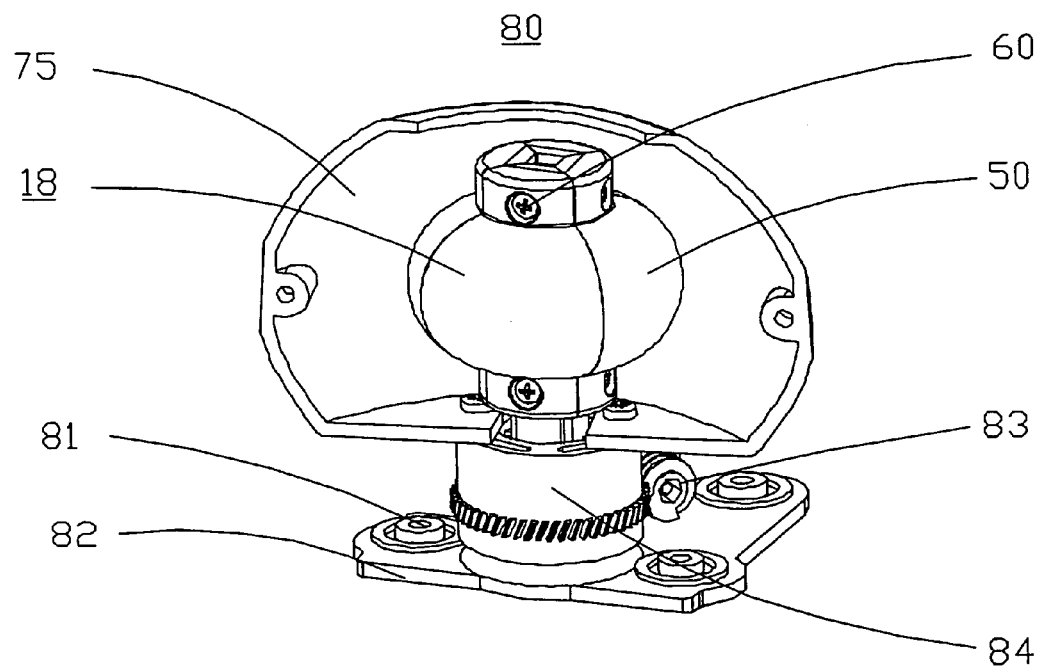

FIG. 5 is a multi-part view consisting of FIGS. 5A-5F of a condensing meniscus, coupling lens in the optical system shown in FIG. 4, wherein FIG. 5A is a sectional view of the lens taken along the line A-A in FIG. 5B; FIG. 5B is a horizontal sectional view through the lens in a horizontal plane through the center of the lens; FIG. 5C is a perspective view of the lens taken from the right as viewed in FIG. 5A; FIG. 5D is an elevational view of the lens looking from the right side of FIG. 5A; FIG. 5E is a perspective view of the lens from the inside thereof; and FIG. 5F is a perspective view of the lens from the outside thereof; and FIG. 6 is a perspective view of an LED beacon of another embodiment of the present invention showing an LED beam beacon.

Figure 1:
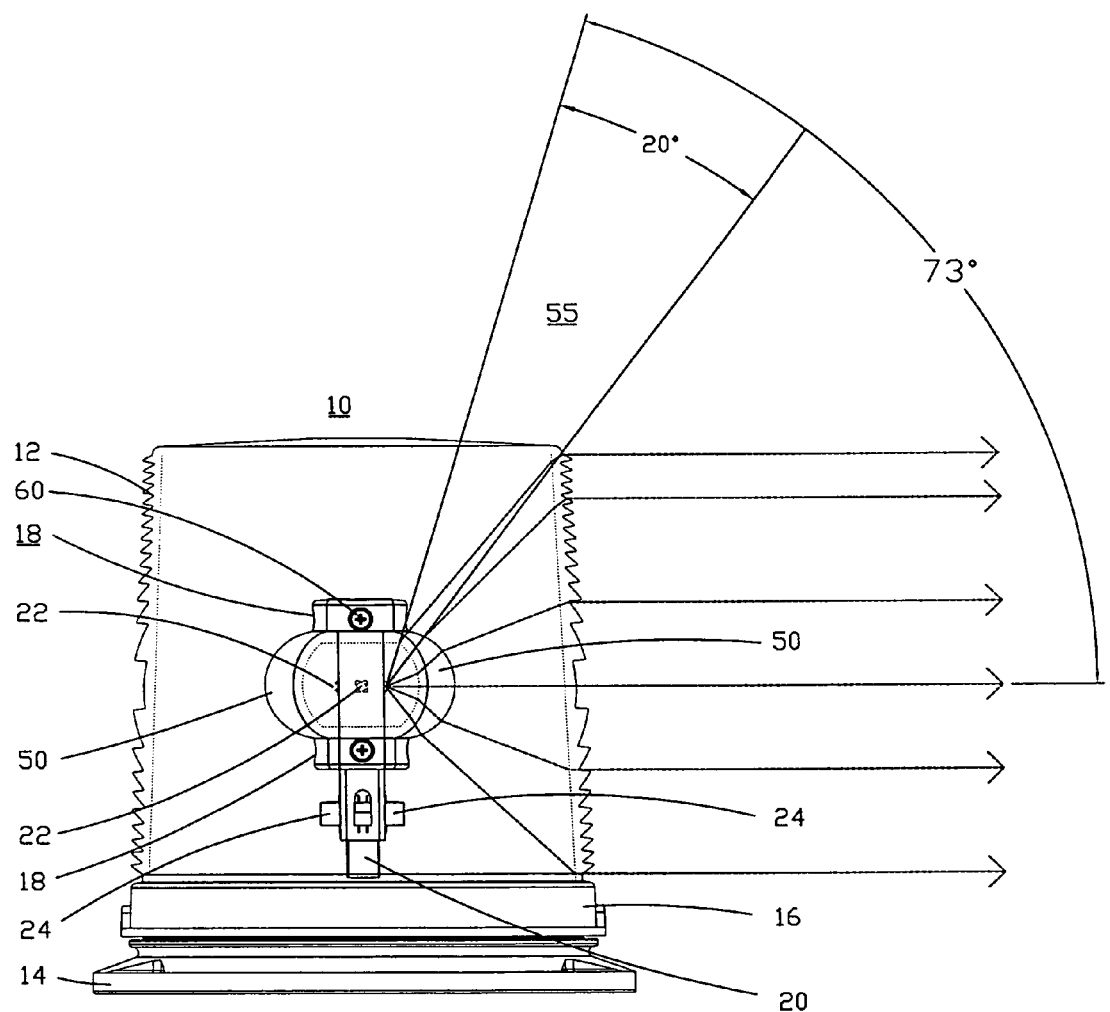
FIG. 1 is a schematic, elevational view of an LED beacon incorporating the invention.
Figure 2:
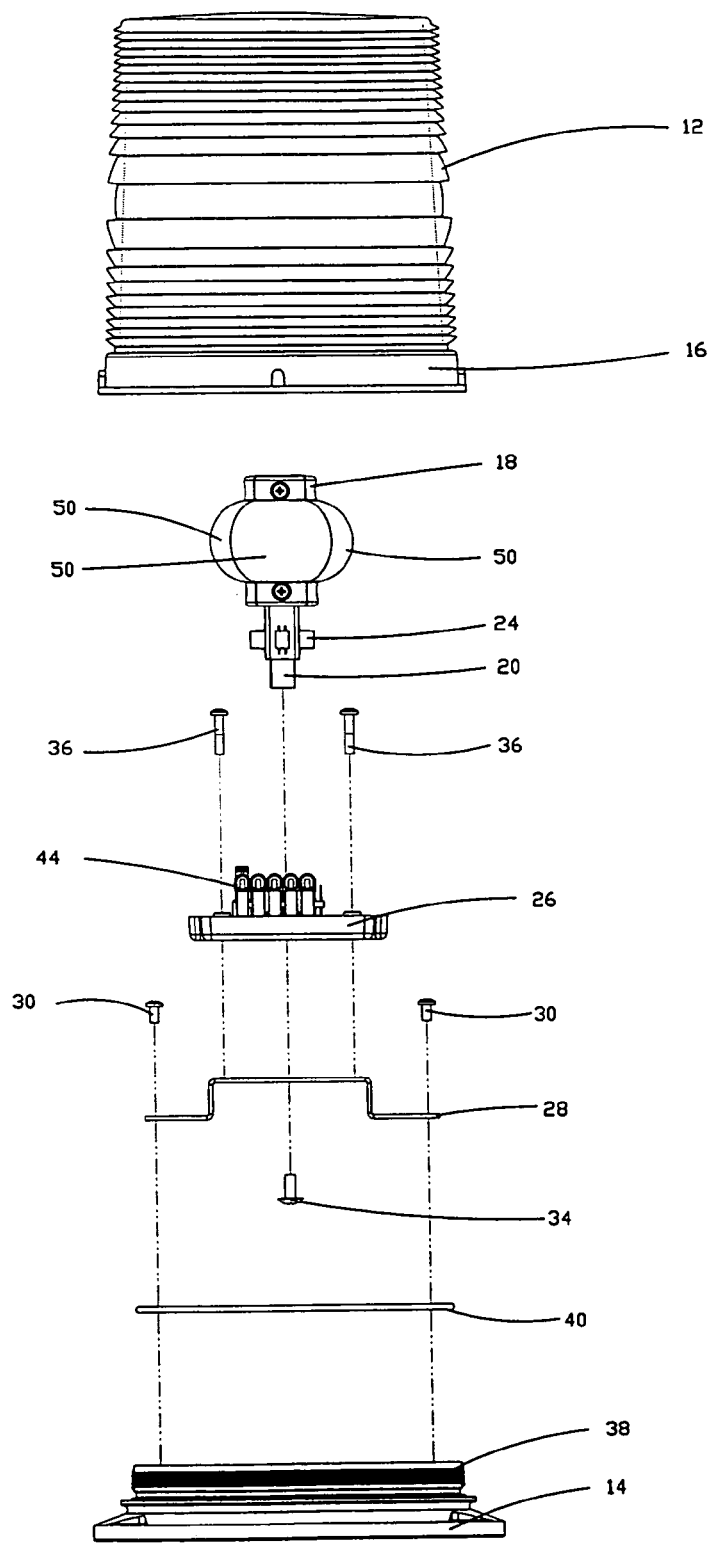
FIG. 2 is an exploded view of the LED beacon shown in FIG. 1.
Figure 3:
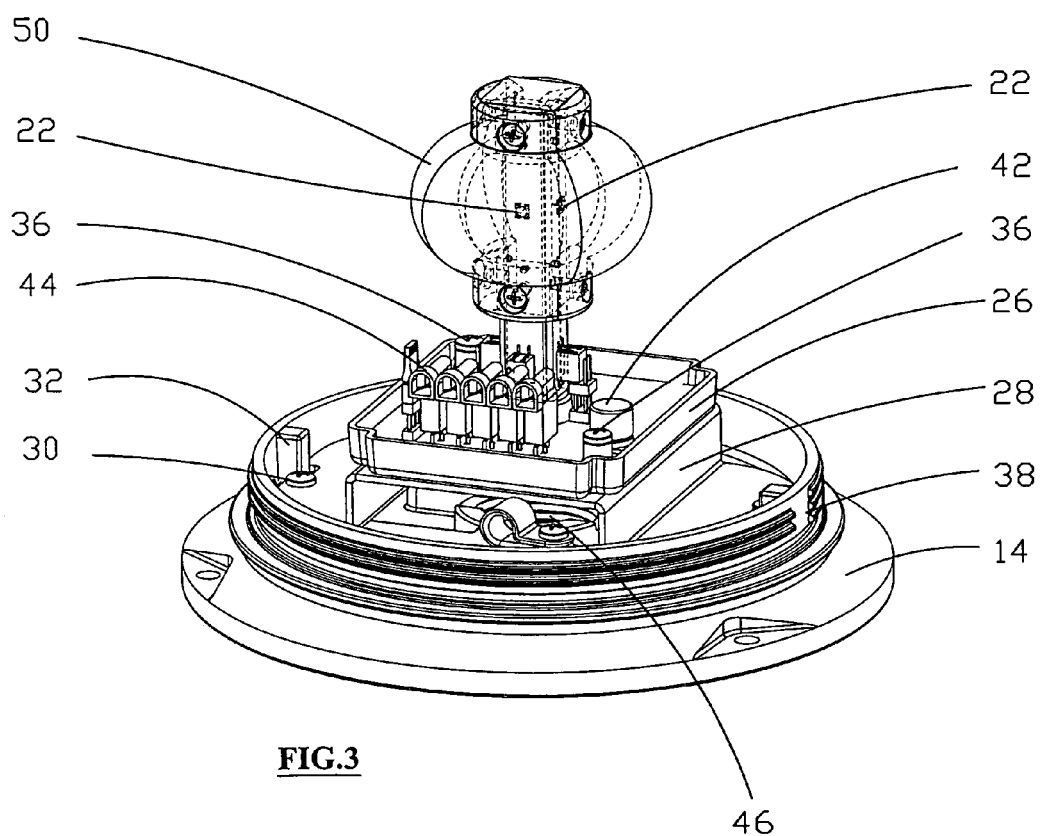
FIG. 3 is a perspective view of the LED beacon shown in FIGS. 1 and 2 with the cap or drum providing a cylindrical fresnel collimating lens not shown in the drawing so as to illustrate the internals of the beacon.

Referring to the drawings, there is shown in FIGS. 1, 2, and 3, an LED beacon 10 having a cylindrical fresnel collimating lens 12 which may be attached to a base 14 via a collar 16. Inside the collimating lens 12 is an LED assembly 18. This assembly 18 has a central post 20 on which is mounted an array of LEDs, e.g., four in number with one on each side of post 20. The post 20 is square in cross-section, and the LEDs are 90° apart. The LEDs 22 are connected via connectors 24 to a circuit board which is potted in a pan 26, as best shown in FIGS. 2 and 3. The pan 26 is mounted on a spacer 28 which is attached by screws 30 to bars 32 projecting radially from the base 14 (see FIG. 3). Another screw 34 attaches the post 20 to the spacer 28 through the pan 26. Other screws 36 attach the pan 26 to the spacer 28. Although the fresnel lens 12 is referred to herein as of a collimating type, depending on the lens 12, the lens 12 may be substantially collimating, or other lens may be used for lens 12 to refract light incident thereto to provide a desired illumination pattern exiting beacon 10.

Screw threads 38 on a cylindrical portion of the base 14 enable the collar 16 of lens 12 to engage base 14, where collar 16 has screw thread along the inner surface of collar 16 which screw onto threads 38 of base 14 thereby attaching the lens 12 to the base 14 and sealing the assembly 18 and the pan 26 and spacer 28. The seal may use an o-ring 40. The lens 12 may be molded plastic material formed into an inverted cup or dome, which may be a desired color. Such inverted cup or dome has a surface defining fresnel lens 12 inside of which LED assembly 18 is located. As shown in FIG. 3, the circuit board has circuit components, such as component 42 which provides circuitry for controlling of, as for example flashing, the LEDs 22. Also connected to the circuit board are connectors 44 which connect wires (not shown). These wires extend outside of the pan 26 and out of the unit through a hole 46 through the base 14. The LED assembly 18 has a plurality of meniscus condensing, coupling lenses 50, one for each of the LEDs 22. The central horizontal plane through which the optical axes of these lenses 50 extend is through the LEDs 22.

The lenses 50 serve two purposes. First, the lenses 50 shift the focus of the fresnel collimating lens 12 (indicated as f, FIG. 5A) to the location of the LEDs 22 (indicated as F in FIG. 5A). Second, as shown in FIG. 1, the condensing lenses 50 also serve the purpose of condensing the illumination emanating from the LEDs 22 so that such illumination covers (paint) the inside of the fresnel collimating lens 12. By virtue of the refraction in the lenses 50, the majority of illumination (approximately ±73° about the horizontal optical axis) from the LEDs 22 is directed to the collimating lens 12 by virtue of the condensing lenses 50. About 20° of the illumination as shown by the area 55 on the upper side of the optical axis is refocused (condensed) into the portion of the illumination which hits the lens 12. Similarly there is another area of about 20° on the lower side of the optical axis which is condensed and hits the lens 12. Thus the radiation pattern of each LED for typical commercially available LEDs such as sold by Cree, or other LED suppliers which would not hit the lens 12, is utilized by virtue of the adapter optics provided by the coupling, condensing lenses 50, thereby enhancing the optical efficiently of the beacon 10. The lenses 50 operate to shift the focus of, and distribute the LED light substantially uniformly to collimating lens 12 thereby efficiently using light from the array of LEDs 22 on post 20 to provide an intense illuminating beacon 10 suitable for use on emergency vehicles, and for other vehicles and industrial applications for warning beacons.

As shown in FIGS. 4 and 5, the meniscus lenses are in four segments each defining angles of 90° so that when assembled on the post 20, they encompass (external around) the entire post over 360°. The lenses have upper and lower collars 58 which are connected to the post 20 by screws 60. The segments may each be of molded optical material, such as plastic, forming the desired lens shape.

The LEDs 22 and the connectors 24 are on circuit boards 70 to which the LEDs 22 and the connectors 24 are wired. Thermal transfer pads 72 of heat conductive material are sandwiched between the circuit boards 70 and the sides of the post 20 to fill the gap between the boards 70 and the post 20 so as to facilitate the transfer of heat from the LEDs to the ambient via the post. When the segments of the condensing lens 50 are assembled on the post, they are located by flanges 76 on the top thereof and by alignment pins 78 (see FIGS. 5A and 5E). FIG. 5A illustrates the design of an exemplary condensing lens 50. The lens material may be polycarbonate lens material.

The concave inside of the lens 50 has a radius of 0.6782 inches. The outer convex surface has a radius of 0.6500 inches. The thickness of the lens along its optical axis is 1.1 inch and the distance to the LED location, F, is 0.2915 inches. The focus of the collimating lens 12 is shifted from its actual focus at f, to the position of the LEDs at F, by 0.2915 inches with the exemplary lens design, as shown in FIG. 5A.

Thus, an LED beacon 10 having an optical system including a collimating lens 12 and a condensing, coupling lens 50 between the LEDs 22 and the collimating lens 12, which not only provides for relocation of the focus of the collimating lens 12, but also enables collimating lenses 12 of various diameter and height to be used with the same array of LEDs 22.

Referring to FIG. 6, another embodiment of the LED beacon is shown in which instead of using collimating optics of fresnel lens 12, beam forming optics of a collimating (or substantially collimating) reflector 75 is utilized. This reflector 75 may be a parabolic reflector which can be rotated about the internal optical assembly 18 of the LEDs 22, post 20, and adapter optics 50. A rotator mechanism 83, 84 on a base 82, may be attached via grommets 81 to a support structure (not shown, e.g., a vehicle roof, light bar) to provide a rotating LED beam beacon. The rotating reflector mechanism may be of the type in U.S. Pat. No. 5,860,726, issued Jan. 19, 1999, to Richardson, which is herein incorporated by reference. The optical assembly 18 and rotator mechanism 83, 84 may be located internally in a transparent or translucent dome, which may of a desired color.

The reflector 75 may also be stationary, instead of rotatable, by removal of the rotator mechanisms 83, 84 (or non-actuation thereof) to provide a stationary LED beam beacon. The optical assembly 18 may be the same as described earlier. Although four LEDs 22 on post 20 is preferred, optionally a single LED may be used in optical assembly 18 on one side of post 20 to direct light toward the stationary reflector 75 via the adapter optics 50. Accordingly, a parabolic reflector 75 that is stationary or can be rotated about the internal optical assembly 18 is provided, but other beam shaping optics may be used depending on the particular application.

LEDs 22 on post 20 may number four, one on each side of the post 20 in optical assembly 18. However, more than four LEDs 22 may be used, such as eight in number by providing two LEDs 22 on each side of post 20, but other number of LEDs may be used.

The present invention broadly relates to use of an adapter optic (the condensing coupling lenses 50) in a horizontal array with horizontal LED's so as to obtain the full benefits of LED illumination vs. conventional incandescent, halogen or strobe illumination. The collimating, fresnel lenses do not have to be redesigned to accommodate LED illumination. Existing domes providing collimating lens for the beacon, and tooling for producing the domes may be used thereby reducing development effort and financial cost in providing an LED beacon. The adapter optics enables increase of the light output significantly over prior LED designs even where no optics internal of the dome or outside lens is used.

From the foregoing description, it will be apparent that there has been provided an improved LED beacon. Variations and modifications in the herein described LED beacon within the scope of the invention will undoubtedly suggest themselves to those skilled in the art. Accordingly, the foregoing description should be taken as illustrative and not in a limiting sense.

The invention claimed is:

1. An LED beacon comprising:
at least one LED surrounded by a collimating lens;
a condensing, coupling lens for optically coupling said LED and the collimating lens, said coupling lens being operative to shift the focus of the collimating lens to the position of said LED along an optical axis extending through the collimating lens, said coupling lens, and said LED; and
wherein said coupling lens changing the illumination from said LED so that the radiation pattern of said illumination is condensed to cover the collimating lens.

2. The LED beacon according to claim 1 wherein the collimating lens is a fresnel cylindrical lens.

3. The LED beacon according to claim 2 wherein the condensing coupling lens is a meniscus lens.

4. The LED beacon according to claim 1 wherein a plurality of LEDs are provided as part of an assembly on a post and a plurality of coupling lenses are provided one for each of said LEDs, each of said coupling lenses being a meniscus lens which is a segment around approximately 90° of said post.

5. The LED beacon according to claim 1 wherein said collimating lens is substantially collimating.

6. An LED beacon comprising:
at least one LED;
first optics;
second optics between said LED and said first optics, wherein said second optics changes the illumination pattern from the LED so that substantially all of the LED illumination is incident said first optics; and
wherein said second optics is a lens which shifts the focus of said first optics to the position of the LED.

7. The LED beacon according to claim 6 wherein said first optics is one of a reflector or collimating optics.

8. The LED beacon according to claim 6 wherein said first optics is a reflector rotatable about the LED, in which said LED is part of an array of LEDs and is in an assembly including at least said second optics.

9. The LED beacon according to claim 6 wherein said second optics is a lens which condenses the illumination from the LED.

10. The LED beacon according to claim 6 wherein said first optics is selected from a collimating reflector and a collimating lens.

11. The LED beacon according to claim 6 wherein said first optics is a collimating reflector.

12. The LED beacon according to claim 11 wherein said reflector rotates around the LED and said second optics.

13. The LED beacon according to claim 11 wherein said first optics is a dome having a surface defining a fresnel lens inside of which said LED and second optics is located.

14. The LED beacon according to claim 11 wherein said reflector is stationary with respect to the LED and said second optics.

15. The LED beacon according to claim 6 wherein said LED is one of a plurality of LEDs, said first optics is a cylindrical fresnel collimating lens, and said plurality of LEDs are disposed with respect to said cylindrical fresnel collimating lens to enable said condensing lens to uniformly distribute the illumination from said plurality of LEDs onto said cylindrical fresnel collimating lens.

16. A method for efficiently coupling illumination produced by one or more LEDs onto optics of a stationary or rotating illumination beacon comprising the step of providing a condensing lens between said one or more LEDs and said optics to shape the illumination from said one or more LEDs to enable substantially all of said illumination from said one or more LEDs to be incident said optics of the beacon, and to shift the focus of said optics of said beacon to be incident with said one or more LEDs.

17. The method according to claim 16 wherein said optics is a reflector or lens.

18. The method according to claim 16 wherein said condensing lens is a meniscus lens.

19. The method according to claim 16 wherein said optics is a cylindrical fresnel collimating lens, and said condensing lens uniformly distributes the illumination from said one or more LEDs onto said cylindrical fresnel collimating lens and shifts the focus of said Fresnel lens to be incident with said one or more LEDs.

* * * * *